United States Patent

Teraoka et al.

[11] Patent Number: 5,749,803
[45] Date of Patent: May 12, 1998

[54] DIFFERENTIAL APPARATUS

[75] Inventors: Masao Teraoka; Nobushi Yamazaki, both of Tochigi-ken, Japan

[73] Assignee: Tochigi Fuji Sangyo Kabushiki Kaisha, Japan

[21] Appl. No.: 689,900

[22] Filed: Aug. 15, 1996

[30] Foreign Application Priority Data

Sep. 13, 1995 [JP] Japan .................... 7-235651

[51] Int. Cl.$^6$ ............................ F16H 1/445; B60K 17/16
[52] U.S. Cl. .................................................. 475/249
[58] Field of Search ............................................. 475/249

[56] References Cited

U.S. PATENT DOCUMENTS

| | | | |
|---|---|---|---|
| 1,389,580 | 9/1921 | Davis | 475/252 |
| 1,389,720 | 9/1921 | Ward | 74/464 |
| 2,269,734 | 1/1942 | Powell | 475/252 OR |
| 2,791,919 | 5/1957 | Wildhaber . | |
| 2,869,399 | 1/1959 | Miles . | |
| 3,071,314 | 1/1963 | Flanagan . | |
| 3,251,244 | 5/1966 | Nickell . | |
| 3,412,632 | 11/1968 | McFiggans | 475/252 X |
| 3,768,336 | 10/1973 | Wharton | 475/252 OR |
| 4,677,875 | 7/1987 | Batchleor | 475/249 |
| 4,776,234 | 10/1988 | Shea | 475/150 OR |
| 4,777,838 | 10/1988 | Aarestad | 74/462 X |
| 4,781,078 | 11/1988 | Blessing et al. . | |
| 4,838,118 | 6/1989 | Binkley | 475/150 X |
| 4,954,122 | 9/1990 | Nakao et al. . | |
| 5,019,021 | 5/1991 | Janson | 475/150 OR |
| 5,021,038 | 6/1991 | Beigang | 475/150 OR |
| 5,030,181 | 7/1991 | Keller | 475/180 OR |
| 5,078,660 | 1/1992 | Williams et al. | 475/252 OR |
| 5,083,987 | 1/1992 | Korner et al. | 475/252 X |
| 5,102,378 | 4/1992 | Gobert . | |
| 5,122,101 | 6/1992 | Tseng | 475/249 |
| 5,147,252 | 9/1992 | Mace et al. | 475/252 |

(List continued on next page.)

FOREIGN PATENT DOCUMENTS

| | | |
|---|---|---|
| 130 806 | 1/1985 | European Pat. Off. . |
| 1105103 | 11/1955 | France . |
| 2126823 | 10/1972 | France . |
| 2553169 | 4/1985 | France . |
| 369548 | 2/1923 | Germany . |
| 1164187 | 2/1964 | Germany . |
| 2 305 305 | 8/1974 | Germany . |
| 28 48 206 | 5/1980 | Germany . |
| 39 31 745 | 3/1991 | Germany . |
| 40 13 196 | 10/1991 | Germany . |
| 40 27 368 | 3/1992 | Germany . |
| 4223374 | 7/1992 | Germany . |
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-141254 | 9/1984 | Japan . |
| 60-81275 | 6/1985 | Japan . |
| 62-126645 | 8/1987 | Japan . |
| 62-200071 | 9/1987 | Japan . |
| 63-130961 | 6/1988 | Japan . |
| 2-38733 | 2/1990 | Japan . |
| 3-68634 | 7/1991 | Japan . |

(List continued on next page.)

*Primary Examiner*—Dirk Wright
*Attorney, Agent, or Firm*—Graham & James LLP

[57] ABSTRACT

To enable a reliable differential lock without setting an actuator to be large-sized, a differential apparatus has a differential casing rotated by driving force of an engine, output side helical side gears supported within this differential casing, helical pinion gears connecting the gears, storage holes for storing the gears slidably and rotatably, a locked member connected to the gear, a lock member integrally rotated with the differential casing, a clutch mechanism formed between the members and locking a differential rotation, an actuator for coupling and operating the clutch mechanism, and a cam mechanism for increasing coupling force of the clutch mechanism by receiving differential torque when the clutch mechanism is coupled.

7 Claims, 8 Drawing Sheets

U.S. PATENT DOCUMENTS

| | | |
|---|---|---|
| 5,156,578 | 10/1992 | Hirota . |
| 5,169,370 | 12/1992 | Dye et al. . |
| 5,176,590 | 1/1993 | Haycock .................................. 475/249 |
| 5,282,775 | 2/1994 | Teraoka . |
| 5,295,923 | 3/1994 | Takefuta ............................ 475/160 X |
| 5,310,389 | 5/1994 | Sato ...................................... 74/462 X |
| 5,326,333 | 7/1994 | Niizawa et al. . |
| 5,366,421 | 11/1994 | Hirota . |
| 5,415,601 | 5/1995 | Cilano ..................................... 475/252 |
| 5,458,547 | 10/1995 | Teraoka et al. ............................ 475/89 |
| 5,556,351 | 9/1996 | Hiraisha et al. . |

FOREIGN PATENT DOCUMENTS

| | | |
|---|---|---|
| 4-64747 | 2/1992 | Japan . |
| 6-58379 | 3/1994 | Japan . |
| 2010145 | 1/1991 | Russian Federation . |
| 1442-772 | 1/1987 | U.S.S.R. . |
| 1421-933 | 3/1987 | U.S.S.R. . |
| 1256990 | 11/1970 | United Kingdom . |
| WO 85/04936 | 11/1985 | WIPO . |
| WO 86/02420 | 4/1986 | WIPO . |

DIFFERENTIAL APPARATUS

BACKGROUND OF THE INVENTION

This invention relates to a differential apparatus used in a vehicle.

Figure 1:
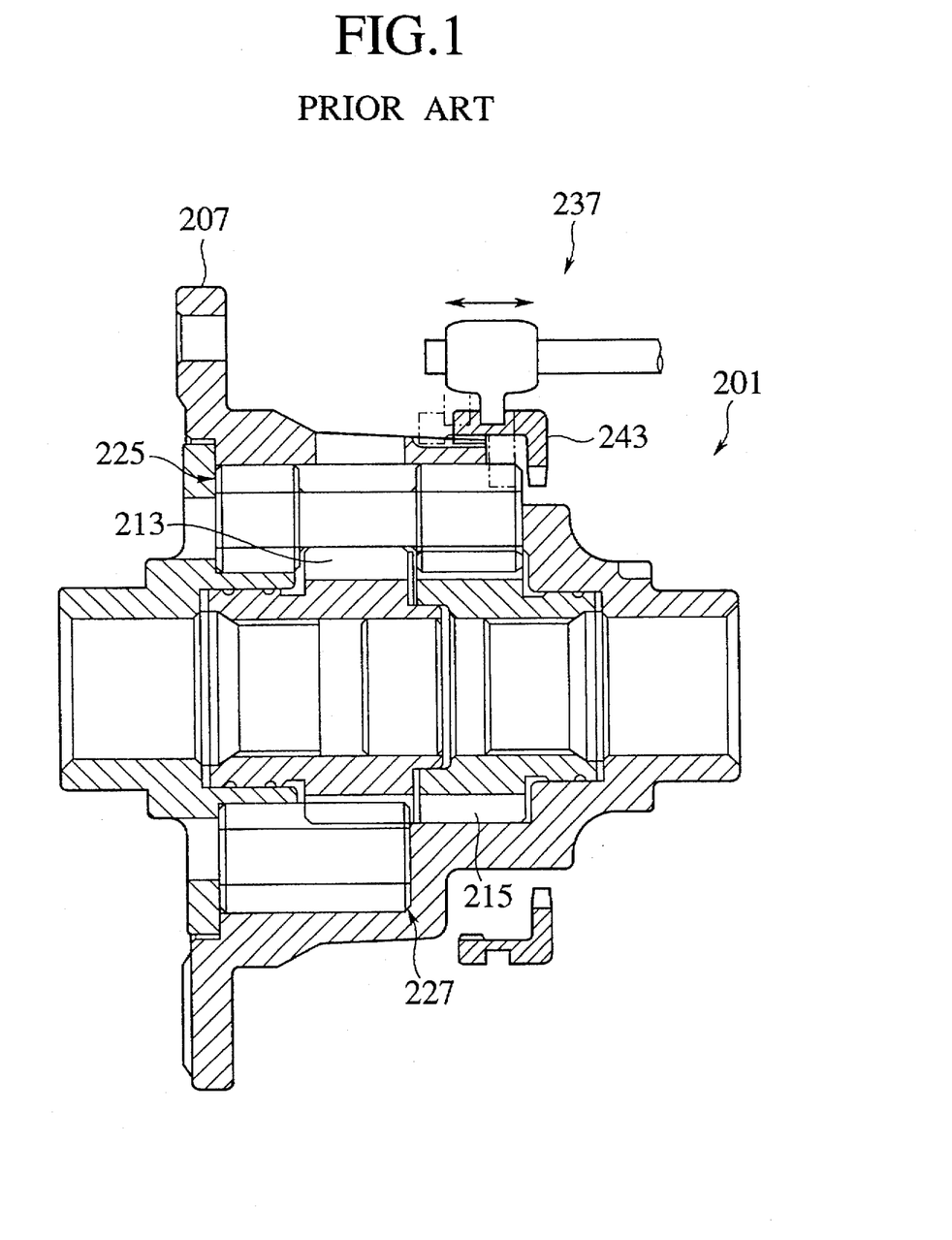
FIG. 1 is a cross-sectional view of a first conventional example.
Figure 2:
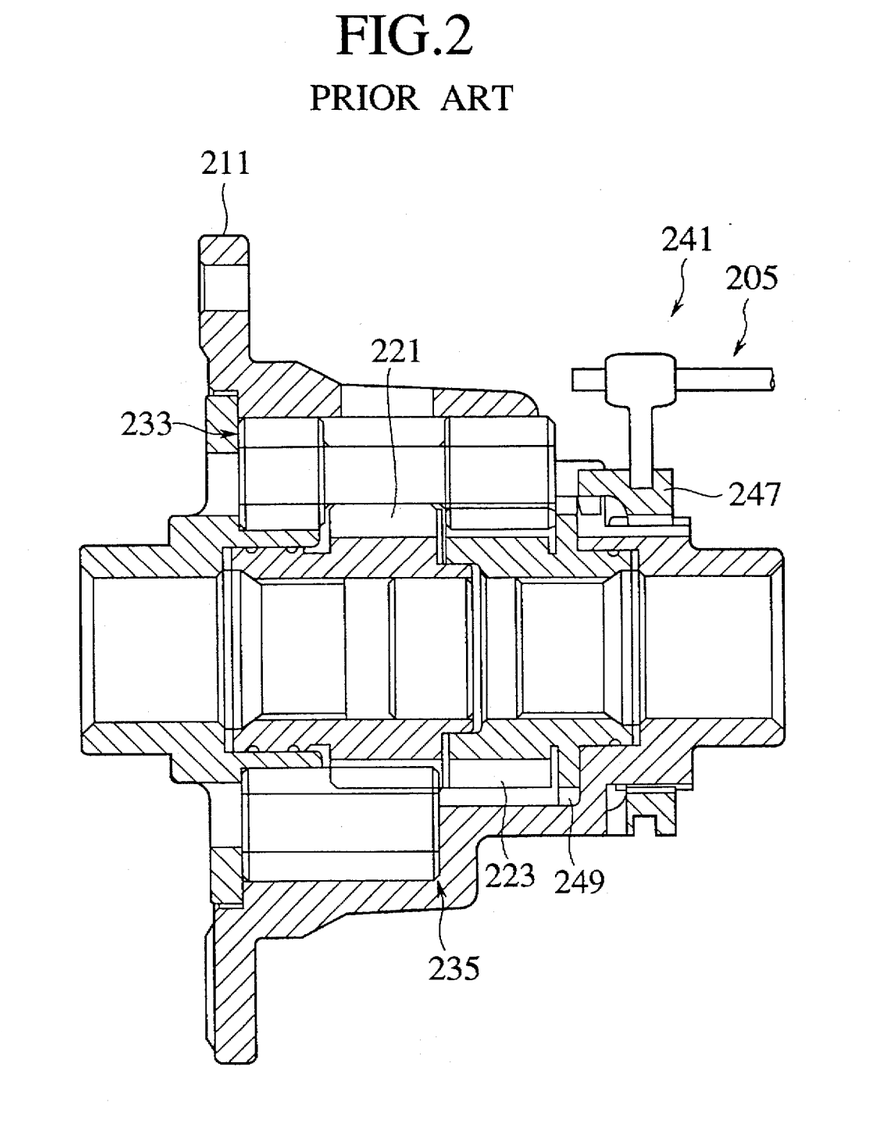
FIG. 2 is a cross-sectional view of a second conventional example.

Differential apparatuses 201, 205 as shown in FIGS. 1 and 2 are described in Japanese Laid-Open Patent No. 6-344783.

These differential apparatuses 201, 205 respectively have differential casings 207, 211, helical side gears 213, 215, 221, 223 on an output side, a pinion gear set composed of a pair of helical pinion gears 225, 227, 233, 235 for connecting the respective side gears, differential lock mechanisms 237, 241 for locking a differential operation, an actuator for performing a locking operation of each of the differential lock mechanisms, etc.

The differential lock mechanism 237 is constructed such that a lock member 243 is directly engaged with the pinion gear 225 as a helical gear. In the differential lock mechanism 241, a spur gear 249 engaged with a lock member 247 is formed in the side gear 223.

In the differential apparatuses 201 and 205 constructed above, when driving force of an engine for rotating each of the differential casings is transmitted from the pinion gear onto a wheel side through the side gear. When the difference in driving resistance between wheels is caused by a bad road, etc., the driving force of the engine is differentially distributed onto each wheel side by self rotation of the pinion gear.

At this time, frictional resistance is caused by an engaging reaction force caused between each gear and the differential casing and an engaging thrust force of the helical gear so that a differential limiting force is obtained.

However, the differential limiting force obtained by such frictional resistance is not so strong. Accordingly, it is insufficient to run the whole distance and escape from a bad road on which the wheels are raced. However, even when a torsion angle of the helical gear is set to be large to strengthen the differential limiting force by the frictional resistance, a processing property and durability of the gear are rapidly reduced and no large differential limiting force capable of locking the differential operation can be obtained. Further, a straight moving property at a running time on a good road is excessively strong so that smoothness at a turning time is lost. Accordingly, the behavior of wheels becomes unstable and wearing and noises of tires are increased.

Therefore, as mentioned above, the differential operation is locked by arranging the differential lock mechanisms 237 and 241 so as to greatly improve properties of the vehicle for running the whole distance and escaping from the bad road.

However, as mentioned above, the lock member 243 is directly engaged with the helical pinion gear 225 in the differential lock mechanism 237. Therefore, there is a case in which the engaging thrust force in a lock releasing direction is applied to the lock member 243 in a certain applying direction of torque applied to the pinion 225.

Accordingly, in this case, it is necessary to set the actuator to be large-sized so as not to release the lock when it is desirable to maintain a locking state of the differential operation.

As mentioned above, in the differential lock mechanism 241, the lock member 247 is engaged with the spur gear 249 on a side of the side gear 223. Accordingly, there is no problem of the troublesome lock release caused by the engaging thrust force. However, in this case, it is also necessary to set the actuator to be large-sized so as to improve responsibility at a lock operating time.

Further, for example, it is necessary to form the spur gear 249 integrally with the side gear 223 so as to construct the differential lock mechanism 241 as in the differential apparatus 205. In general, when the differential lock mechanism is assembled into the differential apparatus, the number of changed portions is large and interchangeability with a normal differential apparatus having no differential locking function tends to be lost.

SUMMARY OF THE INVENTION

Therefore, an object of this invention is to provide a differential apparatus with a differential locking function in which a differential lock operation can be rapidly performed and a locking state can be reliably maintained without setting an actuator to be large-sized, and interchangeability with the normal differential apparatus is high.

The above object is achieved by a differential apparatus comprising a differential casing rotated by driving force of an engine; a pair of output side gears rotatably supported within the differential casing; at least one pair of pinion gears arranged outside the side gears in a diametrical direction and having first gear portions separately engaged with the side gears and second gear portions engaged with each other; storing holes formed in the differential casing and slidably and rotatably storing the respective pinion gears; a locked member coupled to a differential rotating member with respect to the differential casing in a rotating direction; a lock member integrally rotated with the differential casing; a clutch mechanism formed between the locked member and the lock member, and locking a differential rotation by locking the locked member to the differential casing through the lock member; an actuator for coupling and operating the clutch mechanism; and a cam mechanism for increasing coupling force of the clutch mechanism by receiving differential torque when the clutch mechanism is coupled.

The driving force of the engine for rotating the differential casing is distributed to each of wheels from the pinion gears through the side gears. When the difference in driving resistance between the wheels is caused during running on a bad road, etc., the driving force of the engine is differentially distributed to each wheel side by self rotation of each of the pinion gears.

Thus, while torque is transmitted, frictional resistance is caused by an engaging reaction force of the pinion gears and an engaging thrust force in the case of a helical gear construction so that the differential limiting function of a torque responsive type is obtained.

Here, when the clutch mechanism arranged between the locked member on a differential rotating member side and the lock member on a differential casing side is coupled, a differential operation is locked by locking rotation of the differential rotating member such as the pinion gears and the side gears differentially rotated with respect to the differential casing. Thus, properties of a vehicle for running the whole distance on a bad road and escaping from the bad road are greatly improved.

When the clutch mechanism is coupled, the cam mechanism is operated and its cam force strengthens the coupling force of the clutch mechanism so that a self locking state is set.

Thus, in the construction of the present invention, the locked member is coupled to the differential rotating member in a rotating direction and the lock member is engaged with this locked member. This construction is different from a conventional example in which the lock member is directly engaged with each of the side gears. Accordingly, mutual bad influences on the engaging thrust force of the differential gears and the differential lock mechanism constructed by the clutch mechanism, the cam mechanism, etc. are prevented even when each of the gears is constructed by a helical gear.

In addition to this, a self locking function is obtained by the cam mechanism as mentioned above. Accordingly, a rapid differential locking operation having a good responsive property can be performed without setting the actuator, the clutch mechanism, etc. to be large-sized. Further, a troublesome locking release in a differential locking state is prevented so that the differential locking state is normally maintained.

A through hole for the lock member can be formed in the differential casing, and the cam mechanism can be formed between the through hole and the lock member. In this case, the differential locking operation having a good responsive property can be performed without setting the actuator, the clutch mechanism, etc. to be large-sized. Further, the troublesome locking release is prevented when the differential lock is necessary. Accordingly, a stable differential locking state can be maintained.

In addition to this, if an existing lubricating hole opened to the differential casing is used as a through hole for the lock member, it is not necessary to newly process the differential casing to assemble the clutch mechanism, the cam mechanism, etc. Accordingly, a reduction in strength of the differential casing and a rise in processing cost are avoided.

If the differential lock mechanism is detached from the differential apparatus, the differential apparatus becomes a normal differential apparatus having no differential lock function and capable of obtaining the differential limiting force of a torque responsive type by frictional force caused by the engaging reaction force and the engaging thrust force between the gears. Accordingly, interchangeability with the normal differential apparatus is maintained.

The locked member can be engaged and coupled to one of the side gears as the differential rotating member and is opposed to an end portion of each of the pinion gears and can be arranged within the differential casing. Thus, mutual bad influences on the engaging thrust force of each of the gears and the differential lock mechanism are prevented by engaging the locked member with the separate side gears even when each of the gears is constructed by a helical gear.

In the differential locking state, the engaging reaction force of the clutch mechanism is transmitted such that the pinion gears are directly pressed against the differential casing through the locked member. Accordingly, this frictional resistance acts as restraining force of the pinion gears at a differential locking time so that the locking state can be rapidly obtained. The differential restraining force caused by this frictional resistance is also added when the locking state is maintained. Thus, the differential limiting force of a torque responsive type is strengthened so that force for maintaining the locking state can be improved.

The locked member can be movably arranged along an axial direction outside an inner wall of the differential casing coming in contact with the end face of each of the pinion gears, and an opposite portion of the locked member opposed to the pinion gears can be inserted in the axial direction inside said inner wall of the differential casing in a state in which the locked member is moved onto the axial inner side. In this construction, the movement of the pinion gears on the axial outer side can be restricted by making the end face of each of the pinion gears come in contact with the inner wall of the differential casing. Further, in a releasing state of the differential lock, the engaging reaction force and the engaging thrust force of the pinion gears are applied to the inner wall of the differential casing so that such engaging reaction and thrust forces are not inputted to the locked member. Accordingly, in the releasing state of the differential lock, there is no case in which the engaging reaction force and the engaging thrust force of the pinion gears act on the differential lock mechanism and frictional resistance is caused between the pinion gears and the differential lock mechanism. Therefore, there are no bad influences on the differential limiting characteristics of a torque responsive type.

Further, the supporting width of a storing hole with respect to each of the pinion gears can be secured. A circumferential supporting length of the storing hole can be sufficiently secured. Accordingly, falling of the pinion gears is prevented and an engaging state with a partner side gear can be preferably maintained.

Further, the differential apparatus can be constructed as follows. Namely, the differential casing has a casing body and a cover. The locked member and the lock member are arranged inside an inner wall of the differential casing. The cam mechanism is formed between a rotating direction side face of the lock member and a wall face of the cover or said casing body. A clutch portion of the locked member is formed in a flange portion integrally rotated with the side gears. The actuator is arranged in the exterior of the differential casing and couples and operates the clutch mechanism by moving and operating the lock member through an operating member. In this construction, the clutch mechanism and the cam mechanism are arranged within the differential casing. Accordingly, a projecting portion projected outside the differential casing is small so that the differential apparatus is correspondingly easily stored into a storage container and the differential apparatus is correspondingly easily laid out.

A sliding area can be increased by arranging the flanging portion in the side gears so that the differential limiting force of a torque responsive type caused by the engaging thrust force can be greatly strengthened.

It is also possible to arrange a biasing member for moving the lock member onto a couple releasing side of the clutch mechanism when the couple of the clutch mechanism is released. Thus, the lock member and the locked member are separated from each other by the biasing member in a releasing state of the differential lock (a releasing state of the couple of the clutch mechanism). Accordingly, the differential lock is prevented when no actuator is operated. It is also possible to prevent the clutch mechanism from being uselessly coupled even when the locked member is slightly moved by thrust force of the differential rotating member coupled to the locked member. Thus, reliability of the differential lock mechanism is highly held.

Further, each of the gears can be constructed by a helical gear. Thus, the differential limiting force of a torque responsive type is strengthened by an engaging thrust force of the helical gear. Furthermore, in accordance with the present invention, different from the conventional example, no engaging thrust force of the helical gear is applied in a releasing direction of the differential lock even in the helical gear construction. Accordingly, it is possible to prevent the lock from being released when it is desirable to lock the differential operation. A stable differential locking state can be maintained without setting the actuator to be large-sized.

DESCRIPTION OF THE PREFERRED EMBODIMENTS

Figure 3:
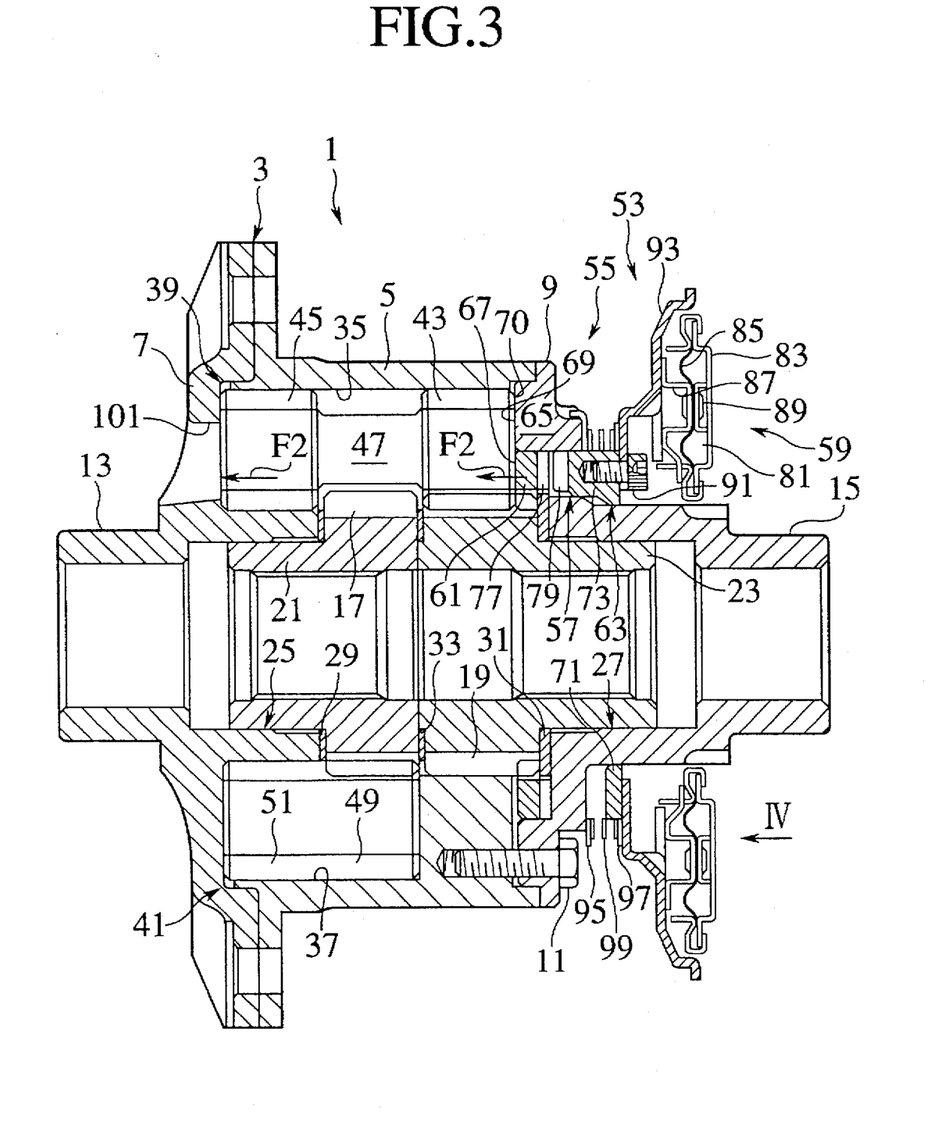
FIG. 3 is a cross-sectional view showing a first embodiment form of the present invention.

A first embodiment form of the present invention will be explained with reference to FIGS. 3 to 8. FIG. 3 shows a differential apparatus 1 in this embodiment form. Left-hand and right-hand directions in the following are those in FIG. 3 and members, having no reference numerals are not illustrated.

The differential apparatus 1 is arranged on an axle of a front wheel or rear wheel of a vehicle.

As shown in FIG. 3, a differential casing 3 of the differential apparatus 1 is constructed such that a cover 7 is fixed onto the left-hand side of a casing body 5 by a bolt and a cover 9 is fixed onto the right-hand side of the casing body 5 by a bolt 11. The casing body 5 and the left-hand side cover 7 are divided on faces opposed to a right-hand end face 70 of a pinion gear 39 and a left-hand end face 67 of a lock gear 61 described later. A ring gear is fixed to the differential casing 3 and is engaged with an output gear in a power transmission system for transmitting driving force of an engine. Thus, the differential casing 3 is rotated by the driving force of the engine.

The differential apparatus 1 is arranged within a differential carrier. Boss portions 13 and 15 of the differential casing 3 are supported by the differential carrier through bearings. An oil reservoir is arranged in the differential carrier. A lower portion of the differential apparatus 1 is dipped into this oil reservoir in a rest state. When the differential apparatus 1 is rotated, an oil is splashed upward from the oil reservoir.

Each of side gears 17 and 19 on an output side is constructed by a helical gear and is arranged within the differential casing 3. Hollow boss portions 21 and 23 of the respective side gears 17 and 19 are rotatably supported by supporting portions 25 and 27 of the differential casing 3. The boss portion 21 of the side gear 17 is spline-connected to a left-hand axle (an output shaft). The boss portion 23 of the side gear 19 is spline-connected to a right-hand axle (an output shaft).

Thrust washers 29, 31 are respectively arranged between the side gears 17, 19 and the differential casing 3. A thrust washer 33 is arranged between the side gears 17 and 19.

Four sets of storing holes 35 and 37 are formed in the differential casing 3 in a circumferential direction. Long and short pinion gears 39 and 41 each constructed by a helical gear are sidably and rotatably stored into these storing holes 35 and 37.

The long pinion gear 39 is constructed by a first gear portion 43, a second gear portion 45 and a shaft portion 47 having a small diameter and connecting these first and second gear portions 45, 47 to each other. The first gear portion 43 is engaged with the side gear 19. The short pinion gear 41 is constructed by a first gear portion 49 and a second gear portion 51. No shaft portion is formed between the first gear portion 49 and the second gear portion 51. The first gear portion 49 is engaged with the side gear 17. The second gear portions 45, 51 of the respective gears 39, 41 are engaged with each other on axial left-hand sides of the side gears 17, 19.

The driving force of the engine for rotating the differential casing 3 is distributed to right-hand and left-hand wheels from the pinion gears 41 and 39 through the side gears 17 and 19. When the difference in driving resistance between the wheels is caused during running on a bad road, etc., the driving force of the engine is differentially distributed to the right-hand and left-hand wheels by self rotation of each of the pinion gears 41 and 39.

While torque is transmitted, addendum flanks of the respective pinion gears 39 and 41 are pressed against wall faces of the storing holes 35 and 37 by engaging reaction forces with the side gears 19 and 17 so that frictional resistance is caused. The frictional resistance is also caused between the differential casing 3 and an end face of each of the pinion gears 39, 41 by an engaging thrust force of the helical gear. The frictional resistance is also caused between the differential casing 3 and the side gears 17, 19 through the thrust washers 29, 31. The frictional resistance is further caused between the side gears 17 and 19 through the thrust washer 33.

A differential limiting function of a torque responsive type is obtained by these frictional resistances.

As shown in FIG. 1, a differential lock mechanism 53 is arranged on a side of the right-hand cover 9 of the differential casing 3 (the axial right-hand side of the side gears 17, 19). This differential lock mechanism 53 is constructed by a clutch mechanism 55, a cam mechanism 57, an actuator 59, etc.

The clutch mechanism 55 is constructed by a lock gear 61 (a locked member) and a lock member 63.

The lock gear 61 has a ring shape and is arranged on an axial outer side from an inner wall 69 of the cover 9 coming in contact with the pinion gear 39. An inner circumference of the lock gear 61 is engaged with the right-hand side gear 19 (a differential rotating member). An outer circumference of the lock gear 61 is rotatably supported by an inner circumference of a supporting portion 65 formed in the cover 9. Thus, the lock gear 61 attains an axially movable state. The left-hand end face 67 (a portion opposed to the pinion gear 39) of the lock gear 61 can be moved on the side gear 19 from a left-hand side (an axial inner side) of the inner wall 69 of the cover 9 to a right-hand side thereof (an axial outer side). The left-hand end face 67 is moved in slide contact with the right-hand end face 70 of the pinion gear 39 in a state in which the left-hand end face 67 is inserted onto the left-hand side (the axial inner side) from the inner wall 69.

Figure 4:
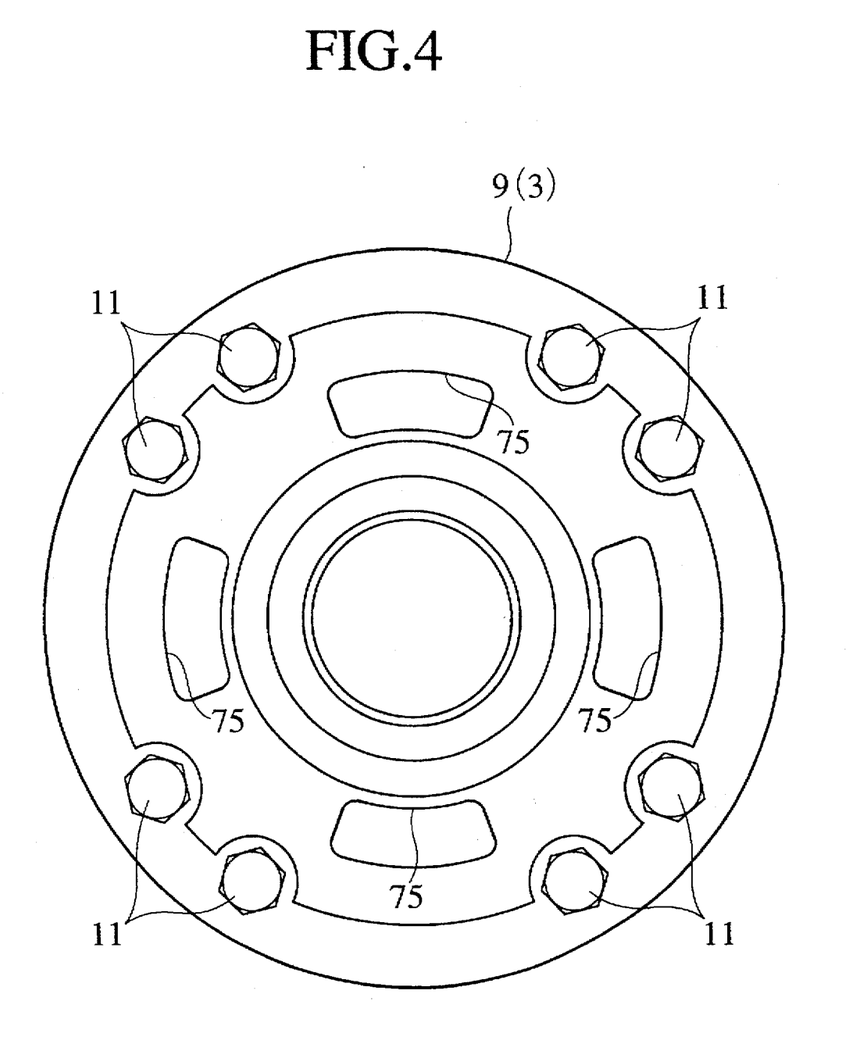
FIG. 4 is a front view of a cover seen from an arrow IV of FIG. 3.

The lock member 63 is constructed by a ring-shaped base portion 71 and four leg portions 73 formed integrally with this base portion 71. As shown in FIG. 4, four through holes 75 for lubrication are arranged in the cover 9. The leg portions 73 of the lock member 63 are respectively inserted into the differential casing 3 from these through holes 75.

As shown in FIGS. 3, 6, 7 and 8, gear portions (clutch portions) 77, 79 are formed in the lock gear 61 and the lock member 63 and are engaged with each other. The gear portion 79 of the lock member 63 is projected on an inner side of the through holes 75. When the lock member 63 is moved leftward from a position of FIG. 3 to a position of FIG. 5, these gear portions 77 and 79 are engaged with each other so that the clutch mechanism 55 is coupled. When the clutch mechanism 55 is coupled, rotation of the side gear 19 is locked and the differential operation of the differential apparatus 1 is locked.

Figure 6:
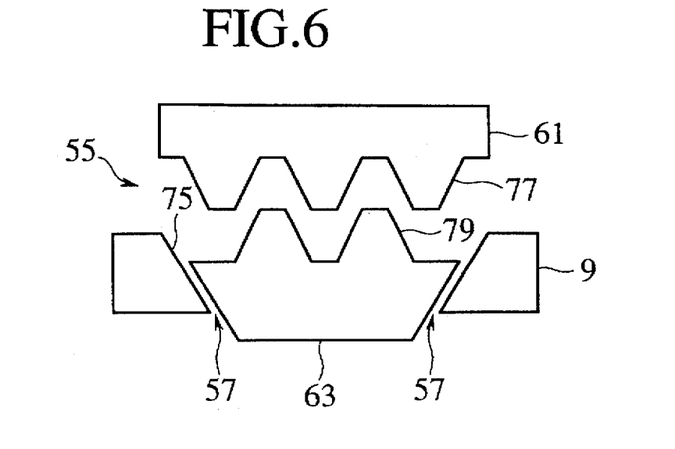
FIG. 6 is a development view of a clutch mechanism and a cam mechanism used in the first embodiment form and showing a releasing state of a differential lock.
Figure 7:
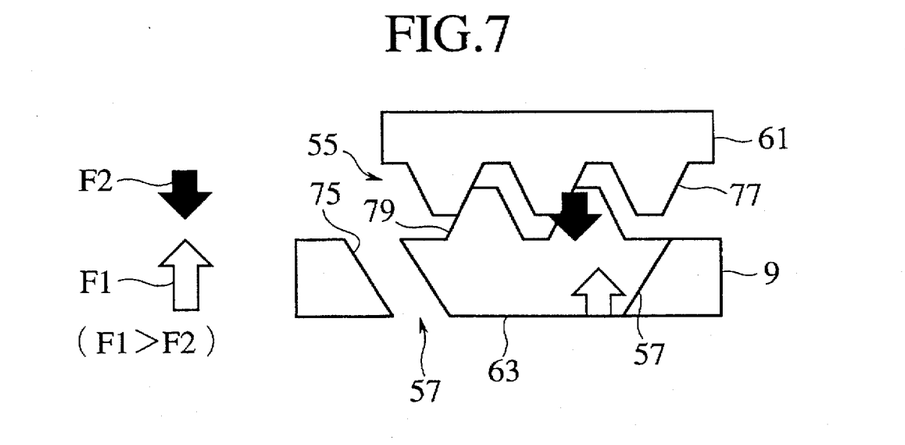
FIG. 7 is a development view of the clutch mechanism and the cam mechanism used in the first embodiment form and showing a state in which the clutch mechanism is coupled and an operation of the cam mechanism is started.
Figure 8:
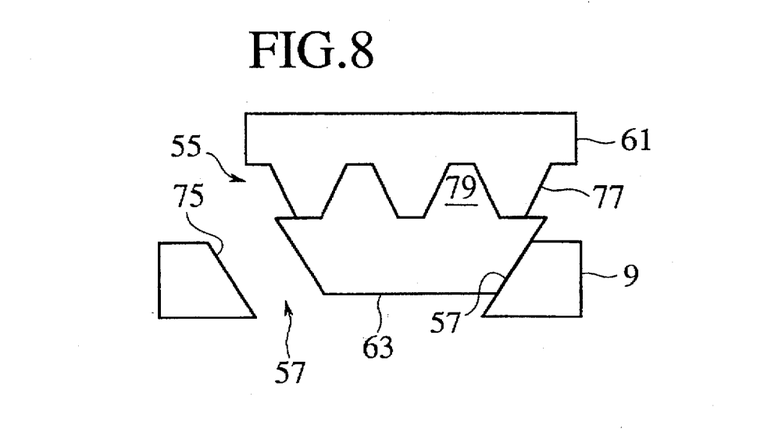
FIG. 8 is a development view of the clutch mechanism and the cam mechanism used in the first embodiment form and showing a self locking state of the clutch mechanism provided by cam force of the cam mechanism.

As shown in FIGS. 6, 7 and 8, the cam mechanism 57 is formed on both sides in a rotating direction between a rotation directional side portion of the lock member 63 and rotating directional wall faces of the through holes 75. When the clutch mechanism 55 is coupled, torque is inputted from the side gear 19 to the cam mechanism 57 so that the lock member 63 is pressed toward the lock gear 61 with cam force F1 as shown in FIG. 7. In contrast to this, engaging reaction force F2 is caused by cam angles in the gear portions 77 and 79 so that the lock member 63 is pushed back. However, the cam force F1 of the cam mechanism 57 is greater than this engaging reaction force F2.

Accordingly, when the clutch mechanism 55 is once coupled, the clutch mechanism 55 attains a self locking state by the cam force F1. Thus, as shown in FIG. 8, the gear portions 77 and 79 are completely engaged with each other so that a differential locking state is maintained.

The actuator 59 has a ring shape and is arranged around the boss portion 15 of the differential casing 3. The actuator 59 is constructed by a fixed member 83, a diaphragm 85 and a pressing member 87. The fixed member 83 and the diaphragm 85 constitute a pressure chamber 81. The fixed member 83 is fixed onto a differential carrier side. The pressing member 87 is fixed to the diaphragm 85 by a rivet 89. The pressing member 87 is opposed to a sliding member 93 fixed to the lock member 63 by a bolt 91.

A coil spring 99 (a biasing member) is arranged through retainers 95, 97 between this sliding member 93 and the cover 9. This coil spring 99 biases the lock member 63 on a couple releasing side (rightward) of the clutch mechanism 55.

Figure 5:
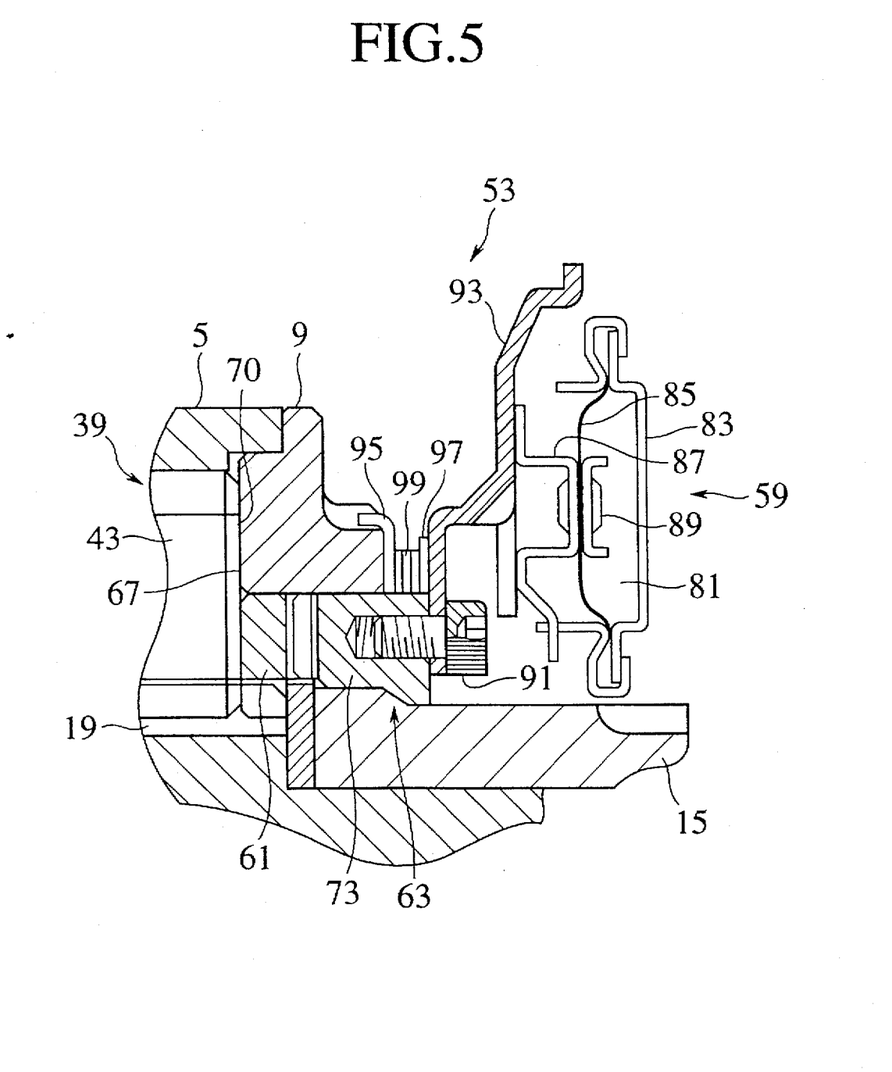
FIG. 5 is a cross-sectional view of a differential lock mechanism used in the first embodiment form.

When an air pressure is supplied to the pressure chamber 81 of the actuator 59, as shown in FIG. 5, the pressure chamber 81 is expanded, and the pressing member 87 moves the lock member 63 leftward through the sliding member 93 while the pressing member 87 flexes the coil spring 99. Thus, the clutch mechanism 55 is coupled and the differential operation is locked. As mentioned above, this locking state is maintained by a self locking function of the cam mechanism 57.

When the supply of the air pressure is stopped, the couple and the differential lock of the clutch mechanism 55 are released by the biasing force of the coil spring 99. At this time, as shown in FIG. 6, the lock member 63 is completely separated from the lock gear 61.

As shown in FIG. 3, in the differential casing 3, a through hole 101 is also formed in the cover 7 in addition to the through holes 75 of the cover 9. The oil in the oil reservoir flows from these through holes 75, 101 into the differential casing 3 irrespective of a rotating time of the differential casing 3 and a stopping time of this rotation. The flowing oil is supplied to the storing holes 35, 37, engaging portions of the respective gears, respective sliding portions generating the differential limiting force of a torque responsive type, the clutch mechanism 55, the cam mechanism 57, etc. so that these constructional members are lubricated.

Thus, the differential apparatus 1 is constructed as above.

With respect to a vehicle mounting the differential apparatus 1 thereon, the behavior of a vehicle body is improved by the differential limiting function of the torque responsive type when large torque is applied to the vehicle as at an starting time and an accelerating time.

When a one side wheel is raced by a bad road, etc., it is possible to prevent the driving torque from being escaped from the raced wheel if the differential operation is locked by the differential lock mechanism 53. Thus, large driving force is transmitted to the other side wheels so that properties for running the whole distance on the bad road and escaping from the bad road are greatly improved.

As mentioned above, the differential apparatus 1 is constructed such that the separate lock gear 61 is engaged with the side gear 19 and the lock member 63 is engaged with this lock gear 61. Therefore, the differential apparatus 1 is not constructed by directly engaging the lock member with a helical side gear as in the conventional example. Accordingly, no engaging thrust force in a lock releasing direction is inputted to the differential lock mechanism 53 even in the differential apparatus 1 in which each of the gears is constructed by a helical gear. Further, since the lock gear 61 is separated from the side gear 19, it is possible to prevent the engaging thrust force caused by the lock gear 61 from having a bad influence on differential limiting characteristics.

Thus, no force in the lock releasing direction is applied to the differential lock mechanism 53. In addition to this, the self locking function is obtained by the cam mechanism 57. Accordingly, a differential locking operation having a good responsive property is performed without setting the actuator 59, the clutch mechanism 55, etc. to be large-sized. Further, a troublesome lock release on a bad road, etc. is prevented. Thus, properties for running the whole distance on the bad road and escaping from the bad road, etc. are normally maintained.

The through holes 75 are existing lubricating holes formed in the differential casing 3. Since each of the through holes 75 is utilized as a through hole for the lock member 63, it is not necessary to newly process the differential casing 3 so as to assemble the differential lock mechanism 53. Accordingly, a reduction in strength of the differential casing 3 and a rise in processing cost can be avoided.

An outer circumference of the lock gear 61 is supported by the supporting portion 65 of the differential casing 3, and positioning of the lock gear 61 and the lock member 63 is performed. Accordingly, defects in engagement and slipping-out of the clutch mechanism 55 are prevented so that the differential lock and the lock release are smoothly performed at any time.

When the differential operation is locked, the engagement reaction force F2 of the clutch mechanism 55 is applied to the lock gear 61 such that the pinion gear 39 is directly pressed against the differential casing 3 as shown in FIG. 3.

Accordingly, this frictional resistance acts as restraining force of the pinion gear at a differential locking time so that a locking state can be rapidly obtained. The differential restraining force by this frictional resistance is also applied even when the locking state is maintained. Namely, the differential limiting force of a torque responsive type is strengthened so that force for maintaining the locking state can be improved.

The lock gear 61 can be moved until the right-hand side of the inner wall 69 of the cover 9. Accordingly, in a releasing state of the differential lock, the engaging reaction force and the engaging thrust force of the pinion gear 39 are applied to this inner wall 69 and are not inputted to the lock gear 61. Therefore, no frictional resistance is caused between the left-hand end face 67 of the lock gear 61 and the right-hand end face 70 of the pinion gear 39. Accordingly, mutual bad influences on the differential lock mechanism 53 and differential limiting characteristics can be avoided in the releasing state of the differential lock.

Further, in the releasing state of the differential lock, the coil spring 99 separates the lock member 63 from the lock gear 61 so that the differential lock is prevented when no actuator 59 is operated. It is also possible to prevent the clutch mechanism 55 from being uselessly coupled when unnecessary even when the lock gear 61 is slightly moved by thrust force of the slide gear 19. Thus, reliability of the differential lock mechanism 53 is highly held.

Further, a supporting width of the storing hole 35 with respect to the pinion gear 39 can be secured. A circumferential supporting length of the storing hole 35 can be sufficiently secured. Accordingly, falling of the pinion gear 39 is prevented and an engaging state with the side gear 19 and the pinion gear 41 as partner side gears can be preferably maintained.

The second gear portions 45, 51 of the pinion gears 39, 41 and the differential lock mechanism 53 are respectively arranged on axial left-hand and right-hand sides of the side gears 17, 19. Accordingly, it is possible to prevent the differential apparatus 1 from being large-sized in the axial direction in comparison with a construction in which the second gear portions 45, 51 and the differential lock mechanism 53 are arranged on one axial side of the side gears 17, 19. Thus, the differential apparatus 1 is easily stored into the differential carrier and is easily laid out.

If the differential lock mechanism 53 is detached from the differential apparatus 1, the differential apparatus 1 becomes the normal differential apparatus having the differential limiting force of a torque responsive type having no differential lock mechanism. If the differential lock mechanism 53 is assembled into the differential apparatus by utilizing an existing lubricating hole as mentioned above, the differential locking function is easily added to the normal differential apparatus. Thus, interchangeability with the normal differential apparatus is maintained.

Figure 9:
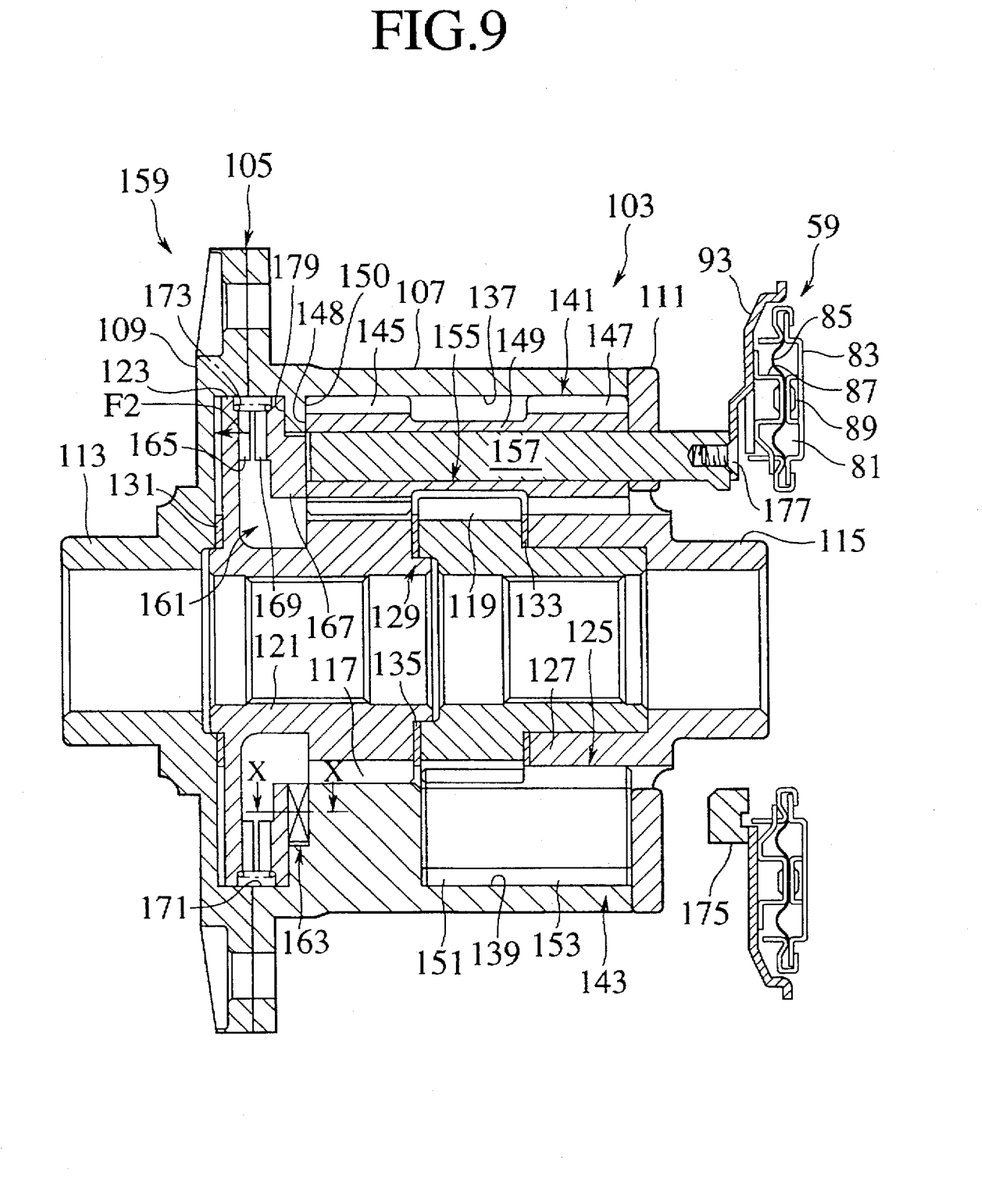
FIG. 9 is a cross-sectional view showing a second embodiment form of the present invention.

A second embodiment form of the present invention will next be explained with reference to FIGS. 9 and 10. FIG. 9 shows a differential apparatus 103 in this embodiment form. Left-hand and right-hand directions in the following are those in FIG. 9, and members having no reference numerals are not illustrated. In these figures and the following explanation, members having the same functions as members in the first embodiment form (the differential apparatus 1) are designated by the same reference numerals and an explanation of these same functional members is omitted.

The differential apparatus 103 is arranged on an axle on a front or rear wheel side of a vehicle.

As shown in FIG. 9, a differential casing 105 of the differential apparatus 103 is constructed such that a cover 109 is fixed onto the left-hand side of a casing body 107 by a bolt and a stopper ring 111 is fixed onto the right-hand side of the casing body 107 by a bolt. A ring gear is fixed to the differential casing 105 and is engaged with an output gear of a power transmission system for transmitting driving force of an engine. Thus, the differential casing 105 is rotated by the driving force of the engine.

Boss portions 113 and 115 of the differential apparatus 103 are supported within a differential carrier through bearings. An oil reservoir is arranged in the differential carrier.

Side gears 117 and 119 on an output side each constructed by a helical gear are arranged within the differential casing 105. A flange portion 123 is integrally formed in a hollow boss portion 121 of the side gear 117. A hollow boss portion 125 of the side gear 119 is rotatably supported by a supporting portion 127 of the differential casing 105. The side gears 117 and 119 support their end portions by a supporting portion 129 formed between these side gears so that centering of these side gears is performed.

These boss portions 121 and 125 are respectively spline-connected to left-hand and right-hand axles (output shafts).

A thrust washer 131 is arranged between the flange portion 123 and the differential casing 105. A thrust washer 133 is arranged between the side gear 119 and the differential casing 105. A thrust washer 135 is arranged between the side gears 117 and 119.

Plural sets of storing holes 137, 139 are formed in the differential casing 105 in a circumferential direction. Long and short pinion gears 141, 143 each constructed by a helical gear are slidably and rotatably stored into these storing holes 137, 139.

The long pinion gear 141 is constructed by a first gear portion 145, a second gear portion 147 and a shaft portion 149 having a small diameter and connecting these first and second gear portions to each other. The first gear portion 145 is engaged with the side gear 117. The short pinion gear 143 is constructed by a first gear portion 151 and a second gear portion 153 each having no shaft portion therebetween. The first gear portion 151 is engaged with the side gear 119. The second gear portions 147, 153 of the respective gears 141, 143 are engaged with each other on axial right-hand sides of the side gears 117, 119.

A through hole 155 is formed at a center of the long pinion gear 141. An operating rod 157 described later extends through this through hole 155 and a stopper ring 111 from the exterior of the differential casing 105. An addendum of the pinion gear 141 is supported by the storing hole 137. The through hole 155 is supported by this operating rod 157.

Driving force of the engine for rotating the differential casing 105 is distributed to left-hand and right-hand wheels from the pinion gears 141, 143 through the side gears 117, 119. When the difference in driving resistance between the wheels is caused during running on a bad road, etc., the driving force of the engine is differentially distributed to the left-hand and right-hand wheels by self rotation of each of the pinion gears 141, 143.

While torque is transmitted, frictional resistance is caused by an engaging reaction force between the storing holes 137, 139 and addendum flanks of the respective pinion gears 141, 143.

The frictional resistance is also caused by an engaging thrust force of the helical gear between the differential casing 105 and an end face of each of the pinion gears 141, 143. The frictional resistance is also caused through the thrust washer 131 between the flange portion 123 and the differential casing 105. The frictional resistance is also caused through the thrust washer 133 between the side gear 119 and the differential casing 105. The frictional resistance is further caused through the thrust washer 135 between the side gears 117 and 119.

The differential limiting function of a torque responsive type is obtained by these frictional resistances.

In the differential apparatus 103, a differential lock mechanism 159 is constructed by a clutch mechanism 161, a cam mechanism 163, an actuator 59, etc. As shown in FIG. 7, the clutch mechanism 161 and the cam mechanism 163 are arranged on axial left-hand sides of the side gears 117, 119. The actuator 59 is arranged in a right-hand side external portion of the differential casing 105.

The clutch mechanism 161 is constructed by a lock gear (a locked member) 165 and a lock member 167 having a ring shape.

The lock gear 165 is formed in the flange portion 123 of the left-hand side gear 117 (a differential rotating member). The lock gear 165 is located on an axial outer side from an end face 148 of the pinion gear 141. The end face 148 of the pinion gear 141 comes in contact with an intermediate wall face (an inner wall) 150 of a casing body 107. Thus, the pinion gear 141 is positioned in the axial direction. Further, as shown in FIG. 9, the lock member 167 is arranged between the lock gear 165 and the first gear portion 145 of the pinion gear 141. A right-hand end side of the lock member 167 is opposed to the operating rod 157.

Thus, the clutch mechanism 161 and the cam mechanism 163 are arranged inside the differential casing 105.

Figure 10:
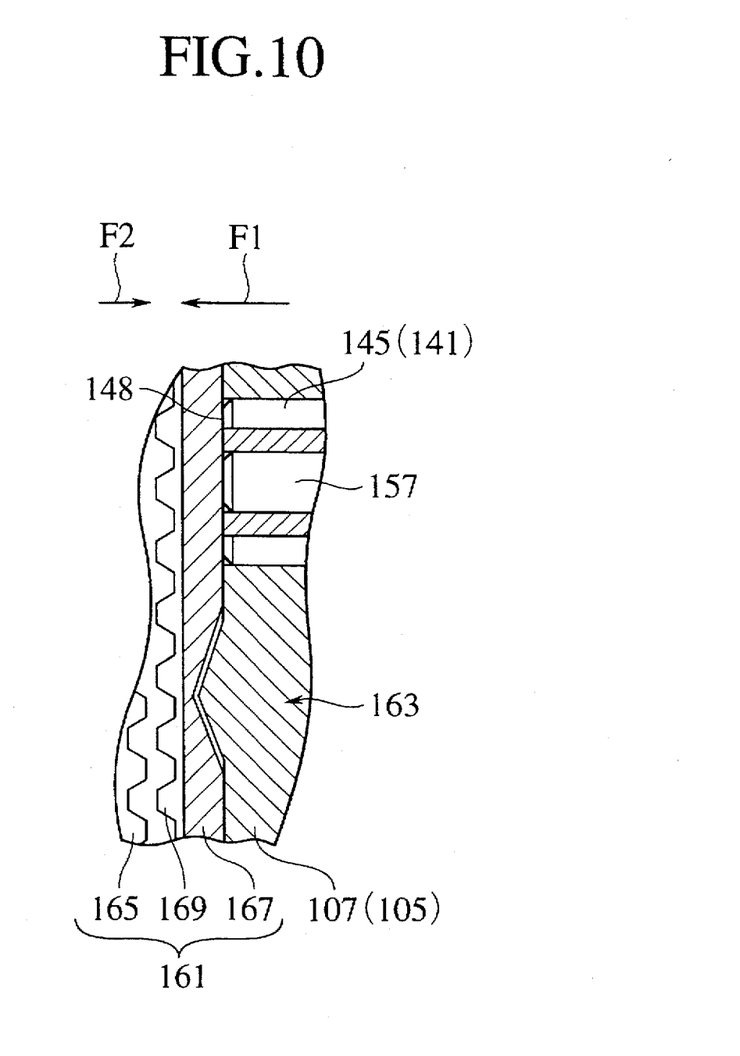
FIG. 10 is a development view of a clutch mechanism and a cam mechanism used in the second embodiment form and is a cross-sectional view taken along line X—X of FIG. 9.

As shown in FIGS. 9 and 10, a gear portion (a clutch portion) 169 engaged with the lock gear 165 is formed in the lock member 167. When the lock member 167 is moved leftward, the gear portion 169 is engaged with the lock gear 165 and the clutch mechanism 161 is coupled. A differential operation of the differential apparatus 103 is locked by locking rotation of the side gear 117.

Outer circumferences of the lock member 167 and the flange portion 123 forming the lock gear 165 are respectively guided by a supporting portion 171 of the differential casing 105 so as to smoothly perform engaging and disengaging operations of the clutch mechanism 161.

As shown in FIGS. 9 and 10, the cam mechanism 163 is formed between the lock member 167 and the casing body 107. When the clutch mechanism 161 is coupled, torque is inputted from the side gear 117 to the cam mechanism 163 and the lock member 167 is pressed toward the lock gear 165 by cam force F1. In the clutch mechanism 161, engaging reaction force F2 is caused by cam angles of the lock gear 165 and the gear portion 169 so that the lock member 167 is pushed back. The cam force F1 of the cam mechanism 163 is greater than this engaging reaction force F2.

Accordingly, when the clutch mechanism 161 is once coupled, the clutch mechanism 161 attains a self locking state by the cam force F1 so that a differential locking state is maintained.

A coil spring (a biasing member) 173 is arranged between the lock gear 165 and the lock member 167. This coil spring 173 biases the lock member 167 on a couple releasing side (in a right-hand direction) of the clutch mechanism 161.

The actuator 59 having a ring shape is arranged around the boss portion 115 of the differential casing 105. A fixing member 83 of the actuator 59 is fixed onto a differential carrier side. An operating rod 157 extending through the pinion gear 141 is integrally formed with a base portion 175 having a ring shape. A sliding member 93 is fixed to a right-hand end portion of this base portion 175 by a bolt 177. A pressing member 87 of the actuator 59 is opposed to this sliding member 93.

When an air pressure is supplied to a pressure chamber 81 of the actuator 59, the pressing member 87 moves the lock member 167 leftward through the sliding member 93 and the operating rod 157 while the pressing member 87 flexes the coil spring 173. Thus, the clutch mechanism 161 is coupled and a differential operation is locked. This locking state is maintained by the self locking function of the cam mechanism 163 as mentioned above.

When the supply of the air pressure is stopped, the couple and the differential lock of the clutch mechanism 161 are released by biasing force of the coil spring 173. At this time, the lock member 167 is completely separated from the lock gear 165.

Through holes are formed in the differential casing. Accordingly, an oil in an oil reservoir flows into the interior from these through holes irrespective of a rotating time of the differential casing 105 and a stopping time of this rotation. The flowing oil is supplied to the storing holes 137, 139, engaging portions of the respective gears, respective sliding portions generating the differential limiting force of a torque responsive type, the clutch mechanism 161, the cam mechanism 163, etc. so that these constructional members are lubricated.

Thus, the differential apparatus 103 is constructed as above.

With respect to a vehicle mounting the differential apparatus 103 thereon, the behavior of a vehicle body is improved by the differential limiting function of the torque responsive type when large torque is applied to the vehicle as at an starting time and an accelerating time.

When a one side wheel is raced by a bad road, etc., it is possible to prevent the driving torque from being escaped from the raced wheel if the differential operation is locked by the differential lock mechanism 159. Thus, large driving force is transmitted to the other side wheels so that properties for running the whole distance on the bad road and escaping from the bad road are greatly improved.

Similar to the above differential apparatus 1, the differential apparatus 103 is not constructed such that the lock member is directly engaged with the helical side gear as in the conventional example. Accordingly, no engaging thrust force in a lock releasing direction is applied to the differential lock mechanism 159 even when each of the gears is constructed by a helical gear. In addition to this, the self locking function is obtained by the cam mechanism 163.

Accordingly, a differential locking operation having a good responsive property is performed without setting the actuator 59, the clutch mechanism 161, etc. to be large-sized. Further, a troublesome lock release on a bad road, etc. is prevented. Thus, properties for running the whole distance on the bad road and escaping from the bad road, etc. are normally maintained.

As mentioned above, the lock gear 165 (the flange portion 123) and the lock member 167 constituting the clutch mechanism 161 are guided by the supporting portion 171 of the differential casing 105. Accordingly, the differential lock and the lock release (the couple and the coupling release of the clutch mechanism 161) are smoothly performed at any time.

In a releasing state of the differential lock, the biasing force of the coil spring 173 is applied to a pressure receiving face 179 of the differential casing 105 through the lock member 167 so that bad influences on differential limiting characteristics are avoided.

Further, in the releasing state of the differential lock, the lock member 167 is separated from the lock gear 165 by the coil spring 173. Therefore, an useless differential lock is avoided when no actuator 59 is operated. Further, even when the lock gear 165 is slightly moved by the engaging thrust force together with the side gear 117, it is possible to prevent the clutch mechanism 161 from being suddenly coupled when unnecessary. Thus, reliability of the differential lock mechanism 159 is highly held.

Further, the second gear portions 147, 153 of the respective pinion gears 141, 143, the clutch mechanism 161 of the differential lock mechanism 159, and the cam mechanism 163 are respectively arranged on the axial right-hand and left-hand sides of the side gears 117, 119. Accordingly, an axial large-sized structure of the differential apparatus 103 is avoided in comparison with a construction in which the second gear portions 147, 153, the clutch mechanism 161 and the cam mechanism 163 are arranged on one axial side of the side gears 117, 119. Accordingly, the differential apparatus 103 is easily stored into the differential carrier and is easily laid out.

If the differential lock mechanism 159 is detached from the differential apparatus 103, the differential apparatus 103 becomes the normal differential apparatus having the differential limiting force of a torque responsive type having no differential lock mechanism. Thus, interchangeability with the normal differential apparatus is maintained.

In addition to this, as mentioned above, the clutch mechanism 161 and the cam mechanism 163 are arranged within the differential casing 105 so that a projecting portion projected outside the differential casing 105 is small. Accordingly, the differential apparatus is more easily stored into the differential carrier and is more easily laid out.

Further, a supporting property of the pinion gear 141 is improved by extending the operating rod 157 through a center of the pinion gear 141 so that durability of the differential apparatus 103 is improved. Further, the pinion gear 141 is set to be hollow so that the differential apparatus 103 is correspondingly made light in weight and fuel consumption of a vehicle is improved.

Further, frictional resistance is obtained by the engaging reaction force between this through hole 155 and the operating rod 157. Accordingly, the differential limiting force of a torque responsive type is strengthened by this frictional resistance.

In addition to this, the side gear 117 is directly pressed against the cover 109 of the differential casing 105 by the engagement reaction force F2 through the lock gear 165. The frictional resistance caused by this pressing acts as restraining force of the side gear 117 at a differential locking time. Accordingly, a locking state can be rapidly obtained. Further, if a sliding area of the thrust washer 131 and the flange portion 123 of the side gear 117 is increased, it is possible to greatly strengthen the differential limiting force of a torque responsive type by the engaging thrust force.

The cam mechanism 163 may be formed between the lock member 167 and the cover 109 of the differential casing 105.

In the present invention, each of the pinion gear and the side gear may be constructed by a spur gear instead of the helical gear.

Further, the operating rod 157 may extend through a thickness portion of the differential casing between pinion gear sets in a rotating direction.

Further, in the present invention, the pair of pinion gears may be constructed by pinion gears having an equal length in which a second gear portion is engaged on an inner side of the side gear. Otherwise, the pair of pinion gears may be constructed by pinion gears having an equal length in which second gear portions arranged at both ends of the pinion gears are engaged on both axial sides of the side gear.

The differential apparatus in the present invention can be also used in any one of a front diff (a differential apparatus arranged on an axle on a front wheel side), a rear diff (a differential apparatus arranged on an axle on a rear wheel side), and a center diff (a differential apparatus for distributing driving force of an engine to the front and rear wheel sides).

What is claimed is:

1. A differential apparatus comprising:
    a differential casing rotated by driving force of an engine;
    a pair of output side gears rotatably supported within the differential casing;
    at least one pair of pinion gears arranged outside said side gears in a diametrical direction and having first gear portions separately engaged with the side gears and second gear portions engaged with each other;
    storing holes formed in the differential casing and sidably and rotatably storing the respective pinion gears;
    a locked member coupled to a differential rotating member with respect to the differential casing in a rotating direction;
    a lock member integrally rotated with the differential casing;
    a clutch mechanism formed between the locked member and the lock member, and locking a differential rotation by locking the locked member to the differential casing through the lock member;
    an actuator for coupling and operating the clutch mechanism; and
    a cam mechanism for increasing coupling force of the clutch mechanism by receiving differential torque when the clutch mechanism is coupled.

2. The differential apparatus as claimed in claim 1, wherein a through hole for the lock member is formed in the differential casing, and the cam mechanism is formed between the through hole and the lock member.

3. The differential apparatus as claimed in claim 1, wherein the locked member is engaged and coupled to one of the side gears as said differential rotating member and is opposed to an end portion of each of the pinion gears and is arranged within the differential casing.

4. The differential apparatus as claimed in claim 3, wherein the locked member is movably arranged along an axial direction outside an inner wall of the differential casing coming in contact with the end face of each of the pinion gears, and an opposite portion of the locked member opposed to the pinion gears is inserted in the axial direction inside said inner wall of the differential casing in a state in which the locked member is moved onto the axial inner side.

5. The differential apparatus as claimed in claim 1, wherein the differential casing has a casing body and a cover;
    the locked member and the lock member are arranged inside an inner wall of the differential casing;
    the cam mechanism is formed between a rotating direction side face of the lock member and a wall face of said cover or said casing body;
    a clutch portion of the locked member is formed in a flange portion integrally rotated with the side gears; and
    the actuator is arranged in the exterior of the differential casing and couples and operates the clutch mechanism by moving and operating the lock member through an operating member.

6. The differential apparatus as claimed in claim 1, wherein the differential apparatus further comprises a biasing member for moving the lock member onto a couple releasing side of the clutch mechanism when the couple of the clutch mechanism is released.

7. The differential apparatus as claimed in claim 1, wherein each of the gears is constructed by a helical gear.

* * * * *